United States Patent [19]

Southgate et al.

[11] 4,282,511
[45] Aug. 4, 1981

[54] APPARATUS FOR DISCERNING THE NOTICEABLE PRESENCE OF SPATIAL FLUCTUATIONS OF INTENSITY WITHIN A TWO-DIMENSIONAL VISUAL FIELD

[75] Inventors: Peter D. Southgate, Princeton, N.J.; Horatio N. Crooks, Indianapolis, Ind.

[73] Assignee: RCA Corporation, New York, N.Y.

[21] Appl. No.: 110,243

[22] Filed: Jan. 7, 1980

[51] Int. Cl.³ .............................................. G06K 9/00
[52] U.S. Cl. ............................ 340/146.3 F; 250/572; 340/146.3 Q; 350/162 SF; 356/430; 358/106
[58] Field of Search ............... 364/515, 517, 555, 572; 340/146.3 F, 146.3 P, 146.3 Q, 146.3 AQ; 356/387, 430; 250/563, 572; 350/162 SF, 162 ZP; 358/101, 106, 107

[56] References Cited

U.S. PATENT DOCUMENTS

| | | |
|---|---|---|
| 3,783,296 | 1/1974 | Blevins .................................. 250/572 |
| 3,955,095 | 5/1976 | Gadbois et al. ....................... 250/572 |
| 3,989,387 | 11/1976 | Hategan ................................ 250/572 |
| 4,000,949 | 1/1977 | Watkins .......................... 350/162 SF |
| 4,083,627 | 4/1978 | Okano ............................. 350/162 SF |
| 4,159,164 | 6/1979 | Dammann et al. ............ 350/162 SF |
| 4,226,538 | 10/1980 | Van Beeck ........................... 250/572 |

Primary Examiner—Leo H. Boudreau
Attorney, Agent, or Firm—Samuel Cohen; George J. Seligsohn

[57] ABSTRACT

The spatial field is sequentially convolved at each of a plurality of uniformly-spaced intervals along a field dimension with a given type of limited spatial extent kernel function which preferably has a one-octave spatial bandwidth. Convolution combining means derives an output only if the q'th power of the sequential convolutions exceed a threshold corresponding to the just-noticeable presence of spatial frequencies within the spatial bandwidth of the kernel function.

22 Claims, 11 Drawing Figures

APPARATUS FOR DISCERNING THE NOTICEABLE PRESENCE OF SPATIAL FLUCTUATIONS OF INTENSITY WITHIN A TWO-DIMENSIONAL VISUAL FIELD

This application is related to the application of Peter David Southgate, Ser. No. 110,244, filed on even date herewith and assigned to the same assignee as the present application.

This invention relates to apparatus and techniques for examining a two-dimensional spatial field of intensities, such as a two-dimensional visual field, for a noticeable presence of intensity fluctuations within a predetermined limited spatial frequency band. Although apparatus incorporating the present invention has general utility in the field of spatial pattern recognition, it is particularly suitable for use in an inspection system for discerning noticeable non-uniformities in the two-dimensional visual field of such manufactured objects as shadow masks and screens for picture tubes, or even for completed picture tubes. For illustrative purposes, in describing the present invention, it is assumed that the object is a shadow mask for use in a color picture tube.

Color-tube shadow masks, either when flat after initial etch, or after forming to final curvature, can have non-uniformities in transmission which produce an undesirable appearance in a nominally uniform field on the assembled tube. At present, these defects are a cause for mask rejection if they are subjectively judged to be worse than certain pre-established standards. Defects are divided into a number of different standardized recognizable forms. However, in practice, the subjective nature of the judgement makes the threshold for rejection somewhat undetermined, so that a good mask can be rejected and vice-versa. The present invention may be used to provide an objective test which gives a well-defined threshold, and thereby to minimize the occurrence of rejections.

Two distinct types of defects in shadow masks exist. First, there are abrupt non-uniformities due to localized defects, such as a partly blocked aperture or a small tear in the mask. Second, there are less abrupt non-uniformities, caused by non-localized defects, such as the relative size of the mask apertures gradually varying from one region to another over the area of the mask. In accordance with the principles of the present invention, the criteria used for rejection of a mask is to decide how clearly noticeable the non-uniformities are (i.e., how far above the threshold of visibility they are, as perceived by an average human observer).

In accordance with psycho-physical theories of spatial discrimination, the perception of a visual field, which has a slightly non-uniform illumination, as deviating from uniformity, depends upon the magnitude of the non-uniformities and upon their spatial arrangement.

Despite the enormous variety of possible spatial arrangements, the threshold of visibility may be determined by a relatively simple analysis of the non-uniformity pattern. In this regard, it has been found that if patterns consisting of parallel bars of sinusoidal intensity variation are superposed, they will reinforce each other to produce a mutually enhanced visibility, only if they have spatial frequencies lying within about a single octave and if they are oriented within a limited range of directions. Otherwise, there is little interaction. For instance, two such patterns, referred to here as gratings, at the threshold of visibility with a spatial frequency ratio greater than about 2:1 remain close to threshold when superposed. This suggests that visual system has separate channels which convey information on the two separate gratings. The orientation range within which gratings will reinforce turns out to be quite large, being of the order of a field of view of $\pm 30°$.

A factor in determining the threshold of visibility of a grating is the spatial frequency, in cycles per degree, subtended at the eye of an observer. The threshold of visibility is a function of this spatial frequency. For spatial frequencies higher than about 20 cycles per degree, the threshold of visibility becomes very large. Further, the threshold of visibility at any spatial frequency is a function of its spatial extent perpendicular to the bar direction. Specifically, as the spatial extent increases, the threshold of visibility decreases until the spatial extent reaches a certain critical value (such as 14 wavelengths wide), after which there is little further decrease in the threshold of visibility. An additional relevant fact is that the number of wavelengths at the critical width of the pattern does not vary greatly, even though the frequency of the grating may be changed by a large factor.

The present invention provides a quantitative technique, compatible with the aforesaid psycho-physical considerations, which is capable of indicating the degree of visibility, to a human eye, of spatial non-uniformities which have Fourier components within certain predetermined limited spatial frequency bands in an otherwise uniform two-dimensional spatial visual field. Further, although the principles of the present invention are primarily directed to the visibility of non-uniformities to the eye, they may be generally applicable to the discernment of the presence of particular types of non-uniformities which may have frequency components outside those to which the eye responds.

Briefly, in accordance with the principles of the present invention, a length along a given dimension of all or part of a two-dimensional spatial field of intensities is divided into a plurality of uniformly-spaced intervals. This given length is relatively long, being equal to more than one wave-length of the lower limit spatial frequency of a predetermined limited spatial frequency band. The spatial field at each of these plurality of uniformly-spaced intervals is then convolved with a given kernel function. This given kernel function is characterized by (1) having a limited spatial extent along the given field dimension which is substantially smaller than the given length of the given field dimension, (2) having an integrated value over its limited spatial extent substantially equal to zero and (3) exhibiting a spatial frequency passband no greater than the predetermined limited spatial frequency band. A succession of convolutions is made within each interval, the kernel function being displaced by uniform steps for each convolution. The total succession is then a discrete-step approximation of a transform of that portion of the field. An output signal, indicative of the noticeable presence of spatial non-uniformities within the kernel function spatial frequency band, is then derived by a means such as taking the q'th root of the sum of the q'th power of each of the respective convolutions, where q is in the range 2 to 5. Components of the pattern within the frequency band are then indicated to be visible if this signal exceeds a predetermined threshold value.

Figure 1:
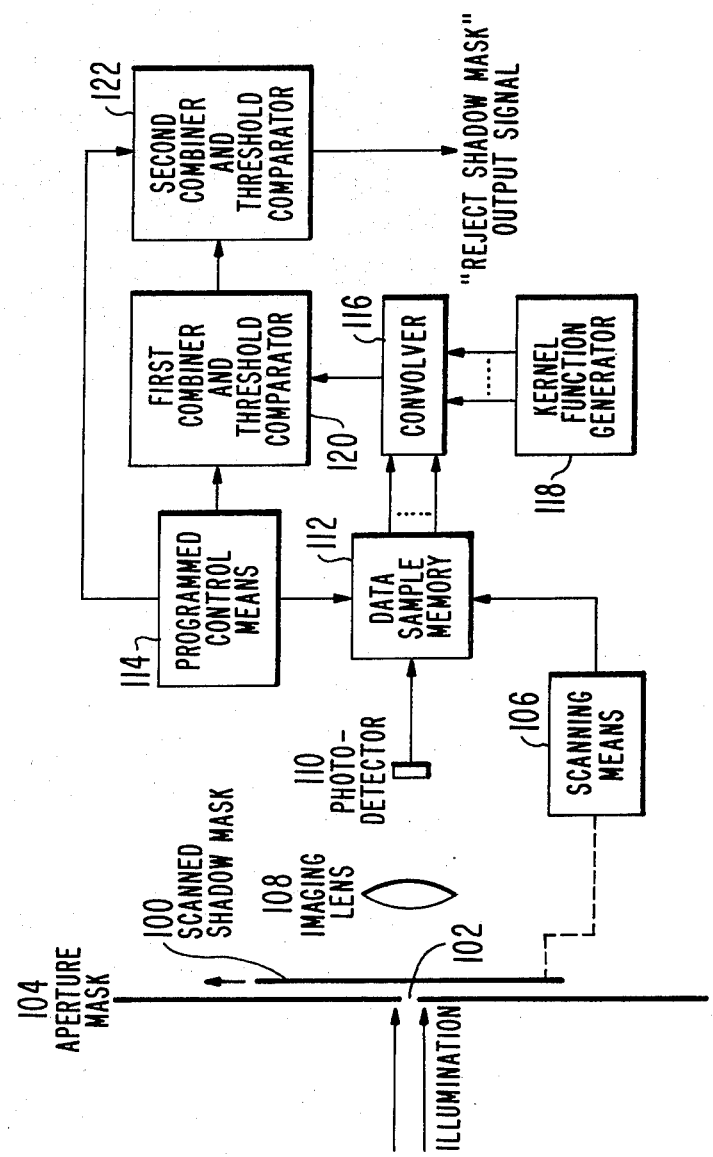
FIG. 1 is a block diagram of one embodiment of the present invention.

Referring to FIG. 1, there is shown a scanned shadow mask 100 for a color picture tube. As is shown in the art, a shadow mask includes a two-dimensional array of small spaced apertures, which conventionally are linear arrays of slits. By way of example, a precision inline shadow mask for a 19" (diagonal) color tube has about 800 mask apertures per square inch. Any one of these apertures may be partly or fully blocked, or a tear in the mask may occur in proximity to any aperture, or the respective sizes of the apertures of the array may not be uniform. The arrangement shown in FIG. 1 is capable of discerning the noticeable presence of such defects in shadow masks 100.

At any instant of time, only an elemental area of shadow mask 100 is illuminated by that portion of light which passes through viewing aperture 102 of aperture mask 104. The shape of the illuminated elemental area of mask 100 is determined by the shape of viewing aperture 102. Preferably, for reasons discussed below, viewing aperture 102, and, hence, the shape of the illuminated elemental area of scanned mask 100, has the shape shown in FIG. 1a. It is to be understood that this shape does not have abrupt edges but is to be graded in optical density from the center clear area. Alternatively, viewing aperture 102, may be imaged on shadow mask 100 by a suitable optical system. In this latter case, an aperture mask 104 is not required to illuminate the elemental area of shadow mask 100. However, in the following description, it is assumed that viewing aperture 102 is part of mask 104.

Figure 1A:
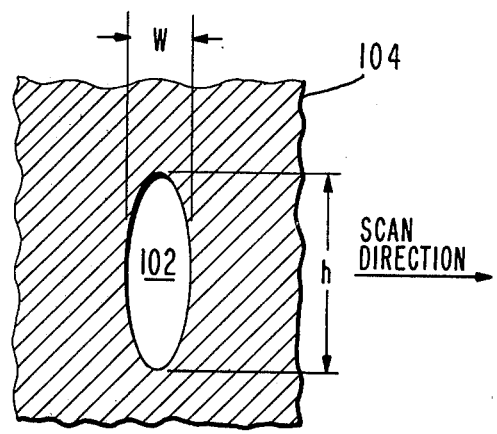
FIG. 1a, 1b, 1c and 1d illustrate certain details of the embodiment of the invention shown in FIG. 1.

Shadow mask 100, which is oriented in a particular angular position (such as that shown in any one of FIGS. 1b, 1c or 1d) with respect to viewing aperture 102, is mechanically linked to scanning means 106. Scanning means 106 scans shadow mask 100 past viewing aperture 102 in a scan direction indicated by the arrows in FIGS. 1, 1a, 1b, 1c and 1d. As indicated in FIG. 1a, the scan direction is parallel to the width w and is perpendicular to the height h of viewing aperture 102. Therefore, one complete scan in the scan direction covers a band, as indicated by a dashed-line pair in FIGS. 1b, 1c and 1d. Scanning means 106 also moves mask 100 in a direction perpendicular to the scan direction at an average rate that is much slower than that in the scan direction. Successive scans in the scan direction overlap to a certain degree, so that together they cover the entire area of mask 100.

Although the illumination of viewing aperture 102 is uniform, it is necessary to filter out, from the light passing through both viewing aperture and shadow mask 100, the very high spatial frequency pattern produced by the uniform array of shadow mask apertures. Viewing aperture 102 has a shape, an optical density gradient, and size to accomplish this. In particular the width w of viewing aperture 102 (FIG. 1a) is at least 1.5 times the spacing interval between adjacent ones of the slit apertures of shadow mask 100. For instance, in the case of a mask for a 19" color tube, a viewing aperture covering about $10^{-2}$ square inches and having a Gaussian shape optical density profile effectively integrates the uniform pattern of light passing through both viewing aperture 102 and the portion of scan mask 100 in cooperative relationship with viewing aperture 102. However, at the same time, the area of viewing aperture 102 is not so large as to filter out non-uniformities at lower spatial frequency that could be discerned by an observer situated at a normal viewing distance from the shadow mask.

Sinusoidal gratings which are components of the total intensity-variation pattern may have any orientation with respect to the direction of a scan-line. The effective wavelength (and hence the measured spatial frequency) of a grating in the scan direction is increased with respect to the actual grating wavelength by a factor equal to the inverse of the cosine of the angle between the grating bars and the scan direction. Since the threshold of visibility is dependent on the actual spatial frequency, this change of effective frequency can lead to false results in discerning the noticeable presence of defects in the shadow mask. However, by using an elongated viewing aperture having the shape of viewing aperture 102, in which the ratio of the height h to the width w is relatively high (e.g. more than 3:1), the shift of apparent frequency due to the grating orientation is accompanied by a reduction in the detected amplitude. The dimensions of the viewing aperture can be arranged so that the change of supposed visibility arising from the frequency shift is compensated by the change in detected amplitude.

Figure 1B:
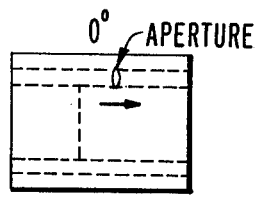
Figure 1C:
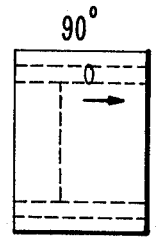
Figure 1D:
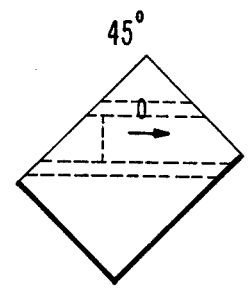

More particularly, the Gaussian shape of viewing aperture 102 operates as a low-pass spatial filter for removing local fluctuations in the brightness of the light passing through viewing aperture 102 and shadow mask 100 due to the small regularly-spaced apertures of shadow mask 100. In addition, as shadow mask 100 is scanned past viewing aperture 102, changes in brightness due to the lower spatial frequencies of grating-like non-uniformities in mask 100 are transmitted with a relative sensitivity that depends both on the spatial frequency of the grating with respect to the dimensions of viewing aperture 102 and also the angle of orientation of the grating with respect to the scan direction. In this regard, the sensitivity is relatively large for small angles between the grating and the scan direction and is relatively small for larger angles. For this reason, the area of shadow mask 100 is first completely scanned, with a series of parallel scans with shadow mask 100 having the first orientation with respect to the scan direction shown in FIG. 1b. Then, shadow mask 100 is rotated 90° with respect to the scan direction, and then has its area completely scanned a second time, in the orientation shown in FIG. 1c. Two such complete scans are normally sufficient to detect gratings having any orientation in the mask. However, since the sensitivity to gratings at 45° to the two scan directions is somewhat reduced, shadow mask 100 may be scanned a third time, at 45° with respect to the initial scan directions, as shown in FIG. 1d.

The light transmitted through viewing aperture 102 and scan shadow mask 100 is imaged by imaging lens 108 on photodetector 110. In response thereto, photodetector 110 generates an electrical signal having an instantaneous amplitude proportional to the brightness of the light impinging thereon. Scanning means 106 applies a scanning control input to memory 112 for sampling the data input thereto in synchronism with the scan of shadow mask 100 at a rate sufficiently high to comply with the Nyquist criterion for the highest spatial frequency of interest. Each sample is then separately stored in memory 112. Memory 112 may be either an analog memory or a digital memory. In the latter case, an analog-to-digital converter is used to convert the value of each sample to digital form for storage.

These stored data must now be analyzed to give the visibility of brightness fluctuations, using the convolution method. A particular way in which this may be done will now be described. First, the algorithm to be used will be expressed in more mathematical terms than in the earlier introduction. The transformation process typically will use a kernel function such as that shown in FIG. 3. If this function is $g(x)$, extending over the limited region $-x_1$ to $+x_1$; and the initial data series is $f(x)$; then the transform will be $$F(x_0) = \sum_{x=-x_1}^{x_1} f(x_0 - x) g(x) \quad (1)$$

Figure 3:
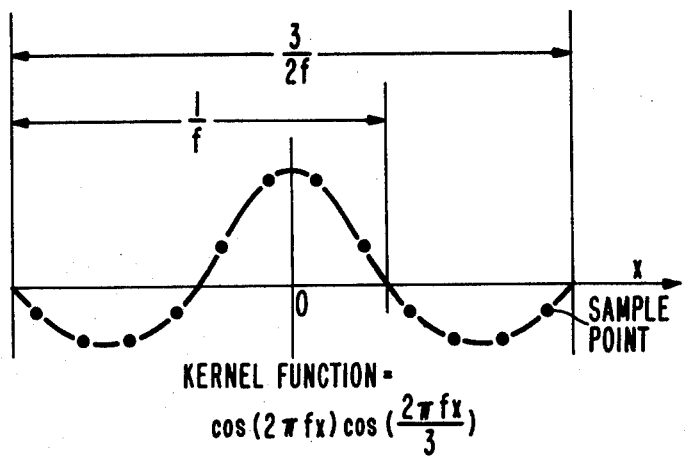
FIG. 3 is a graph of a preferred kernel function that may be employed by the embodiment of FIG. 1, and FIGS. 4a, 4b, 4c and 4d illustrate modifications in the structural arrangement of FIG. 1, required by embodiments of the present invention employing a graded optical kernel function filter.

Here succession values of x represent the locations of the data points which have been stored in memory 112. For the kernel function of FIG. 3, in which the sum of all values in the function is zero, the transform will be zero for a constant value of $f(x)$. It will give a maximum response to a sinusoidal variation at intensity when the spatial frequency is close to the value f, as indicated in FIG. 3. This frequency will be referred to as the center frequency of the kernel function.

A measure of the response of a visual system to the intensity variations may now be made by taking a certain power q of the transform and summing this over a limited region of the scan between $x_2$ and $x_3$:

$$S = \sum_{x_0=x_2}^{x_3} (F(x_0))^q \quad (2)$$

If this sum is taken to the reciprocal power and normalized according to the size of the scan region considered, a value J is obtained which gives an overall characteristic of the field region:

$$J = (S^{1/q})/N \quad (3)$$

where N is the number of points between $x_2$ and $x_3$.

The method of using values of J, in the manner now to be described, is based on results of subjective experiments on perceptual thresholds of visual contrast. The method derives four different values of J, each of which uses a kernel function with a different center frequency, so that the total range of frequencies of interest is covered. For example, these center frequencies could be 1, 2, 4 and 8 cycles per degree of vision. The four values of J derived for any given region of field are then each multiplied by a suitable weighting factor, according to the relative visibilities of the corresponding center frequencies, and the resulting products combined to give a measure of the visibility of the total pattern in that region. One method of combination that has been used is to take the root mean square value of all four products. The result will be referred to as the visibility figure for that region of the scan.

In deriving the value of J, according to equation (2), the transform is taken over a limited region of the field. This region will be chosen depending on the center frequency of the kernel function. In particular, experiment has shown that an appropriate region to take may be in the range of 6 to 12 wavelengths of the center frequency. The actual distance will therefore be different from each of the four different J values.

Figure 2:
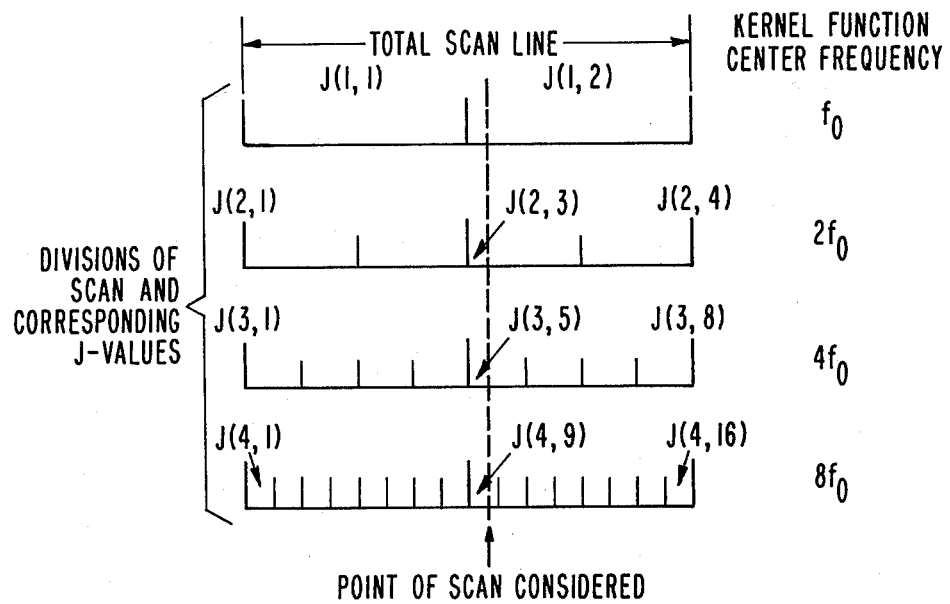
FIG. 2 is a diagram helpful in explaining the operation of the embodiment shown in FIG. 1.

Since a purpose of this invention is to obtain a measure of the visibility of intensity fluctuations over the whole visual field, rather than just a limited region, it is necessary to divide the field into a number of regions and obtain a visibility figure for each region. The way in which this is done according to this invention, is shown in FIG. 2. Four kernel functions are used; for each the scan line is divided into approximately equal regions, which may overlap slightly, each region containing about 6 to 12 wavelengths of the maximum response frequency. J-values are then computed for each region, using the corresponding kernel function. These values are shown in the figure a $J(1,1)$ to $J(4,16)$, the first number indicating the kernel function and the second the subdivision of the scan. If now a particular point in the field is considered as a fixation point of the eye, the total effect of the local fluctuations of intensity is obtained by combining the local J-values. In the figure, this would involve $J(1,2)$, $J(2,3)$, $J(3,5)$ and $J(4,9)$ and these values would be combined as described previously.

If a measure of the intensity fluctuations in the field as a whole is required, these combined J-values should be calculated for all regions of the field. For instance, in FIG. 2, 16 combined values would be calculated for each scan line. This ensemble of values could then be used as a measure of the magnitude and type of non-uniformity of the scan. To return to the original total viewed field, consisting of a number of scan lines using a finite viewing aperture, a total ensemble of combined J-values taken over all scans would then give a non-uniformity measure of the total visual field.

For illustrative purposes in the following discussion, it is assumed, by way of a typical example, that the length of a scan line of scanned shadow mask 100 subtends a 12° viewing angle, and that the sampling rate is such as to sample each scan line of scanned shadow mask 100 at 400 equally-spaced data points. Further, it is assumed that a complete scan in one direction of the area of shadow mask 100 requires many (about 40) successive scan-lines, each of which is analyzed in turn.

Although not limited thereto, the kernel functions used in this example are preferably ones that exhibit a spatial frequency passband width of about one octave (i.e., the value of its upper spatial frequency limit is about twice that of its lower spatial frequency limit). In this regard, FIG. 3 shows a kernel function of a $\cos(2\pi fx) \cos(2\pi fx)/3$ (where x is subtended angular distance and f is the center spatial frequency, in cycles per degree, of the predetermined limited spatial frequency band), and where this kernel function has a limited extent in distance equal to $3/2f$, provides a passband width of about one octave (i.e., has a lower spatial frequency limit of substantially $2f/3$ and has an upper spatial frequency of substantially $4f/3$.

Such kernel functions may be used in the computer processing of values with center frequencies of 1, 2, 4 and 8 cycles per degree and regions are used containing 8 cycles of these frequencies. Thus the regions individually contain about 200, 100, 50 and 25 points, respectively, for the four kernel functions. Thus, the functions themselves contain 48, 24, 12 and 6 points. In the interest of computational economy, it is not necessary to take the transform function $F(x_0)$ (Equation (1)) at every data point since it is a slowly varying function at the lower frequencies.

In this example, the function is taken at intervals of 8, 4, 2 and 1 points, respectively, for each of the kernel functions. Other computational economies may also be made, which retain sufficient accuracy for the purpose of measuring pattern visibility. One such economy, made here, is to approximate the kernel function by a stepwise function if it covers a large number of points. The number of multiplications required in the computation may then be substantially reduced.

In FIG. 1, the computational procedure is illustrated diagrammatically. Data sample memory 112, under the control of programmed control means 114, successively reads out selected sets of data points, each of which sets is applied as a field function input to convolver 116. The function $g(x)$, in equation (1), is specified by kernel function generator 118; the convolution process of equation (1) occurs in convolver 116. The summation of equation (2), together with the operation of equation (3) to give J-values and subsequent multiplication by a preselected weighting factor (that corresponds to a sensitivity values, such as the value of the visual sensitivity characteristic, at the central spatial frequency of the pass-band then under consideration) is shown in the first combiner and threshold comparator 120. Each J value output from first comparator 120 is indicative of the amount by which the visibility of signals within the passband then under consideration exceeds a "just noticeable" visibility that is set by the threshold value of comparator 120 for that passband. The second combiner and threshold comparator 122 then takes the weighted J-value outputs from all kernel functions used in each region, combines them into a visibility value for each region, and then finally combines the visibility values for all regions of the mask into an overall value which appears as a "visibility figure" output therefrom which may be used as an index of the perceived non-uniformity of the mask that exceeds a minimum level of non-uniformity determined by the threshold value of comparator 122. The combinations by comparator 122 preferably should give more weight to higher visibility J-values and regions than to lower visibility J values and regions. This can be achieved, for example, by employing root-mean-square combining techniques.

While the operation of the specific embodiment shown in FIG. 1 clearly demonstrates the principles of the present invention, this specific embodiment operates quite slowly due to the extremely large number of steps required to process the sampled data. FIGS. 4, 4a, 4b, 4c and 4d illustrate modified embodiments of the present invention, which significantly reduce the required number of processing steps.

Figure 4:
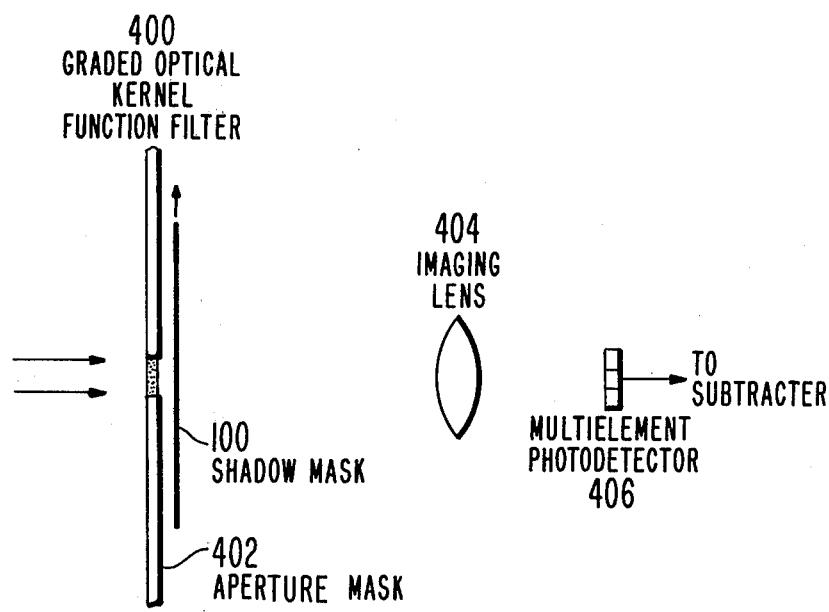
Figure 4A:
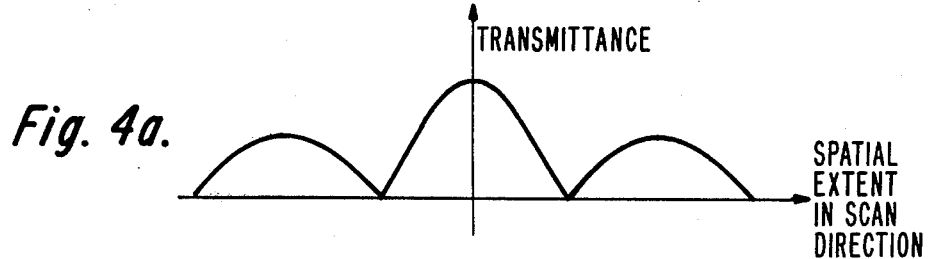

Referring to FIG. 4, scanned shadow mask 100 is illuminated through a graded optical kernel function filter 400, which may have the transmission characteristics shown in FIG. 4a. The kernel function shown in FIG. 4a is similar to the kernel function shown in FIG. 3, except that the negative-half-cycles of the kernel function shown in FIG. 3 are positive in the kernel function shown in FIG. 4. This is necessary because the transmission characteristic of a graded optical filter cannot be made negative.

Filter 400 may comprise a viewing aperture in aperture mask 402, as shown in FIG. 4, or, alternatively, filter 400 may comprise a beam of light of graded intensity on shadow mask 100. In either case, the width of filter 400 in the scan-line direction of shadow mask 100 has a spatial extent corresponding to one and a half wavelengths of the center frequency of a predetermined one of the spatial frequency octave bands. For reasons discussed above, the viewing aperture formed by filter 400 may have a Gaussian shape or otherwise provide a Gaussian distribution of light in a direction perpendicular to the scan-line direction of shadow mask 100.

The light passing through both filter 400 and the apertures of shadow mask 100 are focused by imaging lens 404 on the respective elements of multi-element photodetector 406. As shown in FIG. 4, the output from photodetector 406 is applied to a subtracter.

Figure 4B:
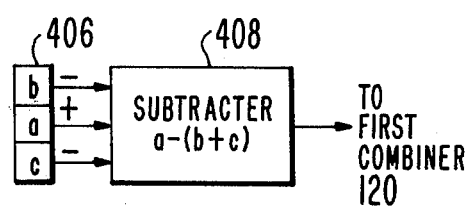

More particularly, as shown in FIG. 4b, photodetector 406 may comprise 3 juxtaposed photodetectors, with photodetector a situated in the middle between photodetector elements b and c. The light image on photodetectors 406 by lens 404 is distributed so that the light corresponding to the relatively large amplitude central half-cycle of FIG. 4a impinges on photodetector element a and the light corresponding with the respective left and right half-cycles impinge respectively on photodetector elements b and c. The output from each of the three elements of photodetector 406 is applied as an input to subtracter 408. Subtracter 408 produces an output proportional to the difference between the total light falling on photodetector element a and the sum of all the light falling on both photodetector elements b and c, as indicated in FIG. 4b. The total light flux impinging on photodetector 406 will be proportional to the convolution of the kernel function of filter 400, shown in FIG. 4a, and the data segment of that portion of shadow mask 100 then in cooperative relationship with filter 400. The effect of subtracter 408 is to translate the kernel function shown in FIG. 4a to the desired kernel function shown in FIG. 3. In this regard, it is essential that the transducing characteristics of all of elements a, b, and c of photodetector detector 406 be correctly proportional, or, alternatively, that subtracter 408 normalize the respective signals from these elements before subtractively combining them. Thus, in the absence of any non-uniformity in shadow mask 100, subtractor 408 produces an output of substantially zero.

In FIG. 4, shadow mask 100 is scanned either continuously in the scan direction or in steps. Successive convolution outputs from subtracter 408 are sampled for each scanning step and are applied as a series of successive inputs to first combiner 120 (FIG. 1).

Each different spatial frequency octave band requires a graded optical kernel function filter 400 of a different spatial extent. Filter 400 can be changed by physically changing the aperture mask. However, if the viewing aperture of filter 400 is formed by an imaged beam, the spatial extent of the kernel function in the scan-line direction can be changed optically by changing the magnification of the imaged beam on shadow mask 100.

Figure 4C:
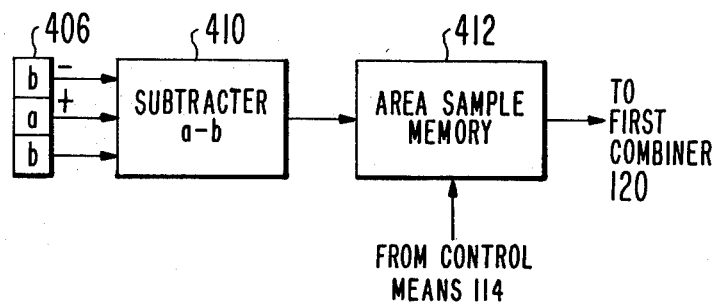

The graded optical kernel function of filter 400, in FIG. 4, may be an area kernel function, rather than a linear kernel function. In this case, the projection of the area kernel function on a diameter thereof, disposed at any angle, has the form shown in FIG. 4a. Further, in this case, multi-element photodetector 406, as shown in FIG. 4c, comprises a circular central photodetector element a surrounded by an annular photodetector element b. Central photodetector element a convolves the light corresponding to the central half cycle of FIG. 4a and the annular photodetector element b convolves the annular area of light corresponding, in cross section, to both the left and the right extreme half-cycles shown in FIG. 4a.

Figure 4D:
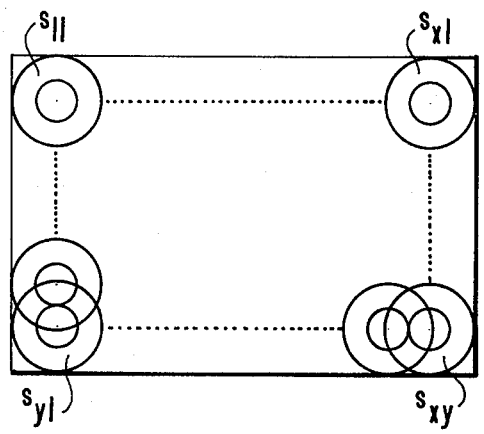

Subtracter 410 provides a convolved output for each sample area of shadow mask 100, which is scanned in both the horizontal and vertical directions and sample outputs are taken at uniform spacings and stored to provide a matrix of overlapping samples of the entire area of shadow mask 100, as indicated in FIG. 4d. Each of these convolved area samples is separately stored in area sample memory 412. Under the control of control means 114 (FIG. 1), a series of stored samples (corresponding to a horizontal direction, a vertical direction, or a 45° direction) may be selectively applied to first combiner 120. Thus, employing the arrangement of FIG. 4c, it is not necessary to successively scan shadow mask 100 as shown in FIGS. 1b, 1c, and 1d. The spatial extent of an area graded optical kernel function filter 400 may be changed in the same manner as described above in connection with a linear graded optical kernel function filter 400.

Other, even faster operating embodiments of the present invention are disclosed in the aforesaid related application Ser. No. 110,244.

For illustrative purposes, the invention has been described in connection with a shadow mask inspection system. However, it should be understood that the principles of the present invention are not limited thereto, but extend to other types of apparatus for examining two-dimensional field of intensities for a presence of intensity variations within one or more predetermined limited spatial frequency bands, in various localized regions of the field. Furthermore, the kernel function need not be the one shown in FIG. 3 nor need it be one that has a bandwidth of substantially one octave. However, it is essential that the spatial extend along at least one dimension be small relative to the region over which the transform is made, so that the region comprises a plurality of uniformly spaced overlapping convolved segments. An important feature of the use of such segment-transform kernel functions is that it is not necessary to remove the discontinuity between the first and last values in a data series, which in a Fourier transform gives large high frequency components.

The present invention, in addition to its use in an inspection system, may also be employed for any spatial pattern recognition purpose. Thus, the transforms of a pattern may be analyzed in accordance with the principles of the present invention and then compared with the known transforms of one or more given spatial patterns to determine whether any of these given spatial patterns is contained in the visual field being analyzed. For instance, "robots," utilizing a programmed computer-controlled, motor-driven articulated arm and gripper, have been developed which perform many different manufacturing tasks. It would be desirable to give such a "robot" a means of recognizing general features of objects in its vicinity. The principles of the present invention may be used to advantage in this application for providing such an artificial "sense of sight."

What is claimed is:

1. Apparatus for discerning, within at least a certain section of a two-dimensional spatial field of intensities, the noticeable presence, along a given field dimension, of intensity variations having spatial frequencies within a predetermined limited spatial frequency band, the given length of said certain section along said given field dimension being equal to more than one wavelength of the lower limit spatial frequency of said limited band; said apparatus comprising:

first means for sequentially convolving said spatial field at each of a plurality of uniformly-spaced intervals along said given field dimension of said certain section with at least one given kernel function, each given kernel function being characterized by (1) having a limited spatial extent along said given field dimension which is substantially smaller than said given length of said given field dimension of said certain section (2) having an integrated value over its limited spatial extent substantially equal to zero and (3) exhibiting a spatial frequency passband no greater than said predetermined limited spatial frequency band, and second means for deriving an output signal equal to the value of the q'th root of the sum of the q'th power of each of the respective convolutions, and comparing this signal with a predetermined threshold value, where q is a given-valued number and where said predetermined threshold value corresponds to a just-noticeable presence of intensity variations having spatial frequencies within said kernel function spatial frequency band along the length of said given field of said certain section.

2. The apparatus defined in claim 1, wherein any one of said kernel functions has the form $\cos(2\pi fx) \cos(2\pi fx/3)$ where x is distance, f is the mid-frequency of that one kernel function spatial frequency band, and wherein said limited extent in distance of that one kernel function if $3/2f$, whereby said spatial frequency band of any one kernel function is substantially one octave in bandwidth, extending from a lower spatial frequency limit of substantially $2f/3$ to an upper spatial frequency limit of substantially $4f/3$.

3. The apparatus defined in claim 2, wherein a plural number of kernel functions are used, each with a different response center frequency, and wherein said first means sequentially convolves each of the corresponding plural number of kernel functions with the spatial field, the center frequencies of the successive kernel functions increasing by factors of approximately two.

4. The apparatus defined in claim 1, wherein said predetermined limited spatial frequency band consists of substantially a given plural number of contiguous bandwidth portions, wherein said first means include means for separately sequentially convolving said spatial field at each of a plurality of uniformly-spaced intervals along said given field dimension of said certain section with respective ones of a set consisting of said given plural number of different kernel functions, each of which kernel functions corresponds with a separate one of said contiguous bandwidth portions.

5. The apparatus defined in claim 4, wherein each of said bandwidth portions is substantially one octave in bandwidth, and wherein each different one of said kernel functions has the form $\cos(2\pi fx) \cos(2\pi fx)/3$, where x is distance and f is the mid-frequency of the respective octave corresponding to that one kernel function.

6. The apparatus defined in claim 4, wherein said first means includes means for performing said separate sequential convolutions in serial order, and wherein said second means derives a separate successive one of said output signals for each of said separate sequential convolutions.

7. The apparatus defined in claim 1, wherein said certain section of said spatial field includes certain spatial frequency components higher than the upper limit spatial frequency of said limited band, and wherein said first means includes low-pass spatial filter means for removing said certain spatial frequencies from said field before said sequential convolving of said spatial field.

8. The apparatus defined in claim 7, wherein said spatial field is a visual field produced by an illuminated two-dimensional object that generates said certain spatial frequency, and wherein said spatial filter comprises a viewing aperture with a Gaussian form of spatial transmission variation for illuminating successive elemental areas of said object, said viewing aperture having dimensions which are large relative to the wavelength of said certain spatial frequency but small relative to those of said limited band.

9. The apparatus defined in claim 8, wherein said object is a mask comprising a uniform pattern of spaced light-transmission apertures defining said certain spatial-frequency, an elemental area containing many of said light-transmission apertures.

10. The apparatus defined in claim 9, wherein said object is a color-picture shadow mask that is mechanically scanned in a given scan direction past said viewing aperture, wherein the size of said viewing aperture in a direction perpendicular to said scan direction is several times the size of said viewing aperture parallel to said scan direction, and wherein the size of said viewing aperture parallel to said scan direction is several times the wavelength of said certain spatial frequency.

11. The apparatus defined in claim 1, wherein said first means includes
   data sample memory means for sampling said spatial field at a first plural number of substantially equally spaced data points which comprise at least said certain section and for separately storing each of said data samples, the spacing between adjacent data points being sufficiently close to comply with the Nyquist criterion for the highest spatial frequency within said predetermined limited spatial frequency band, and
   convolver means coupled to said data sample memory means and to a kernel function generator for making at least one series of sequential convolutions, said sequential convolutions of said one series consisting of the convolution of each of uniformly-spaced segments of data points with a given kernel function corresponding to said one series, each of said segments and the spatial extent of the kernel function corresponding to said one series having a second given length equal to a second plural number of spacings between adjacent data points, said second given length being substantially smaller than said first-mentioned given length of said certain section, and wherein said uniform spacing interval between successive ones of said segments is substantially smaller than said second given length, whereby successive convolved segments of said one series overlap.

12. The apparatus defined in claim 11, wherein said second given length is at least four times said uniformly spaced interval.

13. The apparatus defined in claim 11, wherein said convolver means makes a third plural number of separate series of sequential convolutions, said third plural number of series including a series for which the respective values of said second given length and said second plural number are different from the respective values of said second given length and said second plural number for another of said third plural number of series.

14. The apparatus defined in claim 13, wherein said convolver means makes in succession each one of said third plurality of series of sequential convolutions.

15. The apparatus defined in claim 13, wherein said predetermined limited spatial frequency band has a bandwidth equal to said third plural number of octaves, with each of said third plural number of said series corresponding to different one of said octaves, and wherein the kernel function corresponding to each one of said series has a one-octave passband which is the same as the octave of that one of the series with which it corresponds.

16. The apparatus defined in claim 11, wherein said convolver means makes a third plural number of separate series of convolutions, each of said third plural number of series being comprised of a different subset of said first plural number of data points.

17. The apparatus defined in claim 16, wherein said third plural number of separate series includes both those comprised of data points selected from the same certain section of said field and those comprised of data points selected from different certain sections of said field.

18. The apparatus defined in claim 17,
   wherein said second means produces an individual one of said output signals therefrom in response to each separate one of said third plural number of series, and
   further including third means responsive to all of the output signals of said second means for producing an indication signal in response to said respective levels of the output signals from said second means indicating the noticeable presence of a spatial pattern having a certain spatial-frequency characteristic.

19. The apparatus defined in claim 1, wherein said first means comprises
   a multi-element detector of which one or more certain elements correspond in spatial extent to the positive portions of said given kernel function and one or more other elements correspond in spatial extent to the negative portions of said given kernel function,
   a graded spatial field intensity transmission filter having transmission characteristics which in spatial extent correspond to the absolute value of the positive and negative portions of said given kernel function,
   means for sequentially illuminating said multi-element detector at each of said uniformly-spaced intervals with an image of that segment of said spatial field which has been passed through said graded spatial field transmission filter, and
   subtracting means for subtracting the detected output of those elements of said multi-element detector corresponding to negative portions of said given kernel function from the detected output of those elements of said multi-element detector corresponding to positive portions of said given kernel function.

20. The apparatus defined in claim 19, wherein said given kernel function is a one dimensional spatial function oriented along said given field dimension, and wherein said multi-element detector includes a plurality of linearly juxtaposed elements oriented along a dimension corresponding to said given field dimension.

21. The apparatus defined in claim 19, wherein said given kernel function is a two-dimensional spatial function having a spatial extent corresponding to an elemental area wherein said area of said multi-element detector corresponds to said elemental area and the elements of said detector includes an element surrounded by at least one other element, and said first means further includes an elemental area memory coupled to said subtracting means for separately storing the respective elemental area convolutions represented by each sequential output of said substracting means for all of said respective elemental areas contained in said two-dimensional field.

22. The apparatus defined in claim 21 wherein said second means is coupled to said elemental area memory for supplying as an input to said second means a series of said stored elemental area convolutions along a selected one of a plurality of different predetermined field dimensions, and wherein said first means further includes means coupled to said elemental area memory for selecting said one of said plurality of different predetermined field dimensions.

* * * * *